April 27, 1965  R. W. BROWN  3,180,188
MULTIPLE SPINDLE CAM SHAFT LATHE
Filed Nov. 16, 1962  4 Sheets-Sheet 3
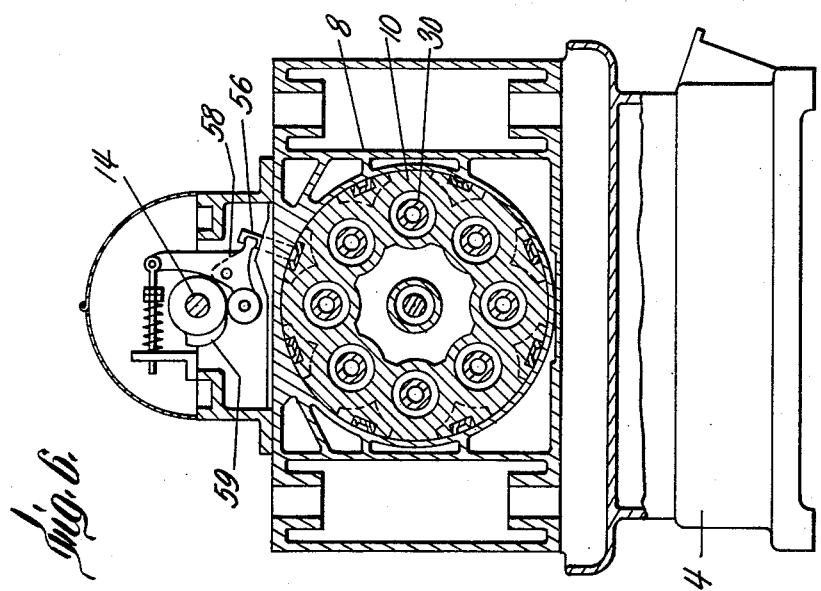
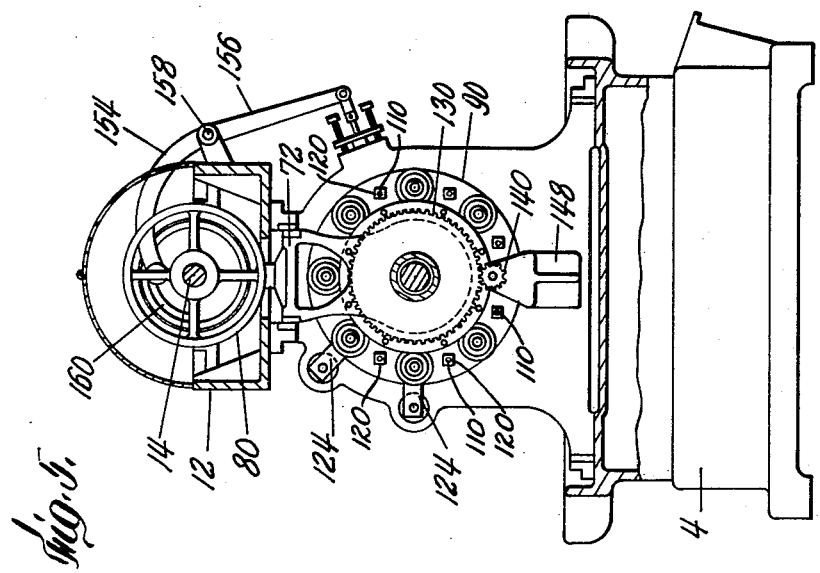
Inventor
Roger W. Brown
Lindsey, Prutzman & Hayes
Att'ys

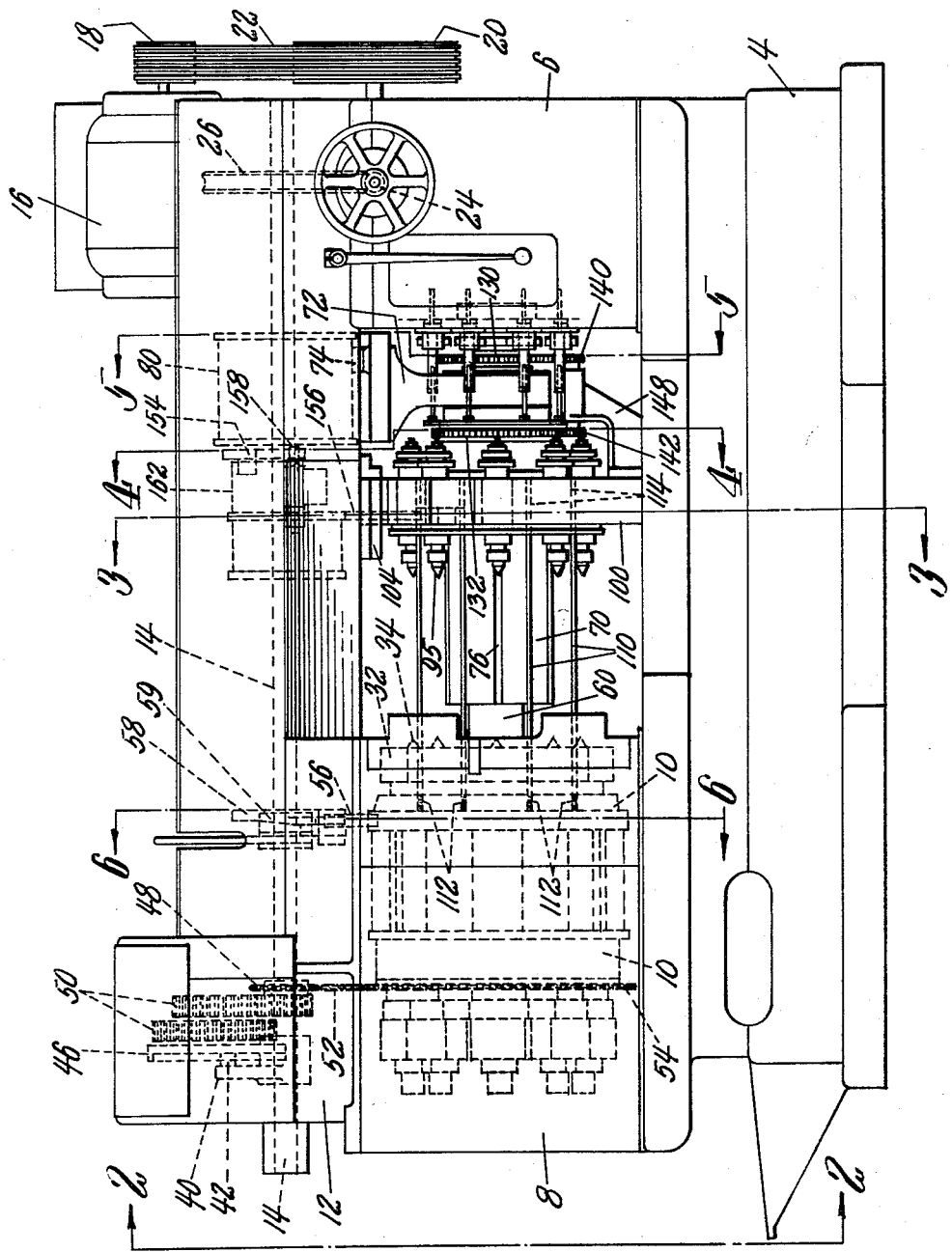

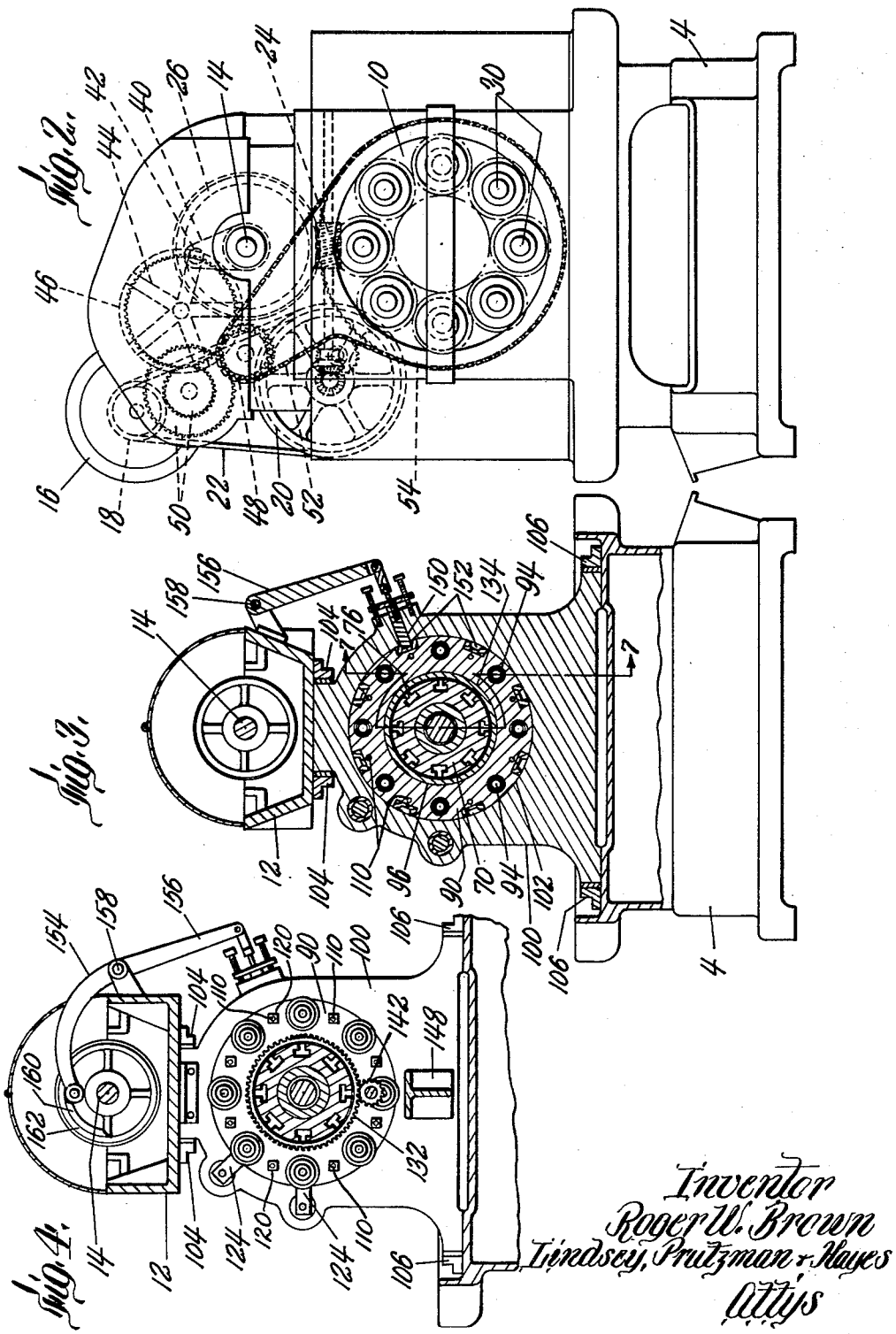

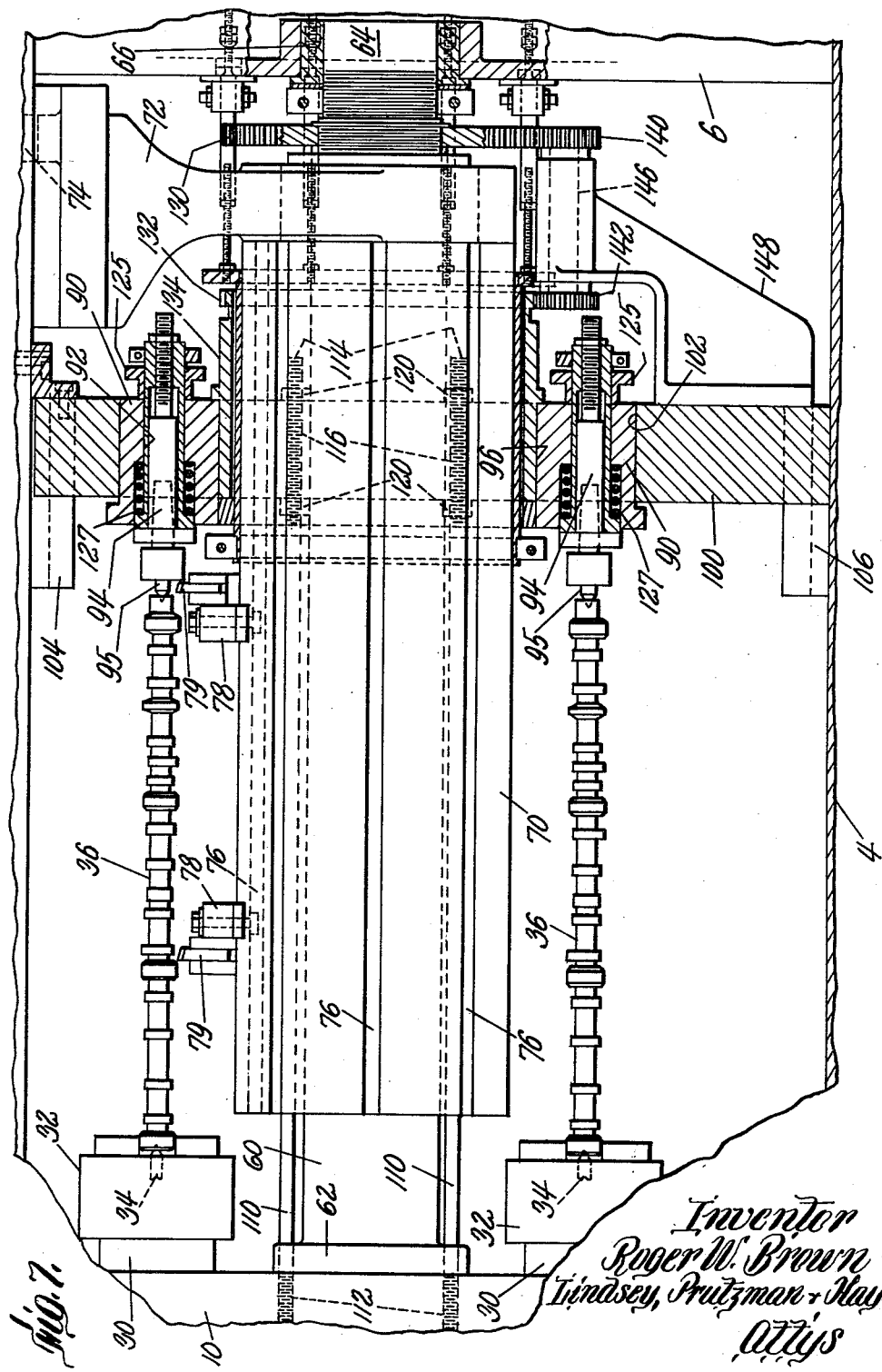

3,180,188
MULTIPLE SPINDLE CAM SHAFT LATHE
Roger W. Brown, Windsor, Vt., assignor to Pneumo-Dynamics Corporation, Cleveland, Ohio, a corporation of Delaware
Filed Nov. 16, 1962, Ser. No. 238,081
8 Claims. (Cl. 82—3)

This invention generally relates to multiple spindle lathes and more particularly to a novel multiple spindle lathe particularly suitable for machining extra long workpieces.

One of the objects of the present invention is to provide a novel multiple spindle lathe that will machine a plurality of extra long workpieces in a highly efficient and convenient manner and without requiring special tooling or extensive work supports. Included in this object is the provision of such multiple spindle lathe that will provide highly increased flexibility in machining methods and operations while at the same time maintaining at a minimum, the skill required in the operation thereof.

A more specific object is to provide in such a lathe a plurality of auxiliary centers that are indexable in synchronism with the spindle carrier and that may be adjusted to accommodate workpieces of various lengths. Included in this object is to provide in such a multiple spindle lathe a novel mechanism for transmitting the indexing movement to the auxiliary centers.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a front-elevational view of a multiple spindle lathe embodying the present invention;

FIG. 2 is a left-hand view of the lathe as shown in FIG. 1;

FIG. 3 is a cross-sectional view taken along line 3—3 of FIG. 1;

FIG. 4 is a cross-sectional view taken along line 4—4 of FIG. 1;

FIG. 5 is a cross-sectional view taken along line 5—5 of FIG. 1;

FIG. 6 is a cross-sectional view taken along line 6—6 of FIG. 1; and

FIG. 7 is an enlarged partial cross-sectional view taken along line 7—7 of FIG. 3 and additionally showing two workpieces.

Referring to the drawings in detail, an eight-spindle lathe of the stop spindle type consrtucted in accordance with the invention is shown in FIG. 1 as comprising a body including a support base 4, a column 6 which houses the drive gears and clutches (not shown), a column 8 which houses a multiple spindle carrier 10, and a top bed 12 which supports a main drum shaft 14 to which are secured the cam drums for driving various units of the lathe in synchronized movement from a motor 16. As best shown in FIGS. 1 and 2, the drive connection between motor 16 and the drum shaft 14 is effected through the pulleys 18, 20, belt 22, worm 24, and worm gear 26 secured to the drum shaft 14.

As best seen in FIGS. 6 and 7, the multiple spindle carrier 10 of the described embodiment carries eight spindles, each designated 30, however, the invention may be incorporated into lathes utilizing a spindle carrier having a greater or lesser number of spindles depending on the number of machining operations required to finish a workpiece. The spindles 30, which are conventionally driven, are shown in FIG. 7 as having secured thereto holding chucks 32 and centers 34 which are adapted to support one end of the workpiece, the latter being shown as a cam shaft 36 for illustrative purposes.

Referring to FIG. 2, the spindle carrier 10 is indexed through means of index arm 40 secured to the drum shaft 14 and having a roll 42 that operates in slots 44 of a Geneva plate 46, to drive a sprocket 48 through means of a series of differential gears generally shown at 50. Movement of the sprocket 48 is transmitted to the multiple spindle carrier 10 by a chain 52 which establishes a driving connection between the sprocket 48 and a larger sprocket 54 secured to the spindle carrier 10. A locking mechanism including a locking pin 56 operated by a cam follower arm 58 and a cam 59 secured to drum shaft 14 is provided, as shown in FIG. 6, to lock the spindle carrier 10 in each indexed position.

In accordance with the invention, there is provided, as shown in FIG. 7, a turret stem 60 having one end 62 fixed to the spindle carrier 10 for movement therewith and having its other end 64 journaled for rotation in suitable bearings 66 provided in column 6. Mounted on the turret stem 60 for slidable movement is a tool turret or tool slide 70 which is secured to a turret slide arm 72 which has a roll 74 fixed to the end thereof. The tool slide 70 is purovided with a plurality of peripherally arranged tool holder slots 76 for adjustably securing tool holders 78 of the conventional type and which are adapted to hold various standard machine tools, FIG. 7 showing turning tools 79 held by the tool holders 78. Longitudinal sliding movement of the tool slide 70 for feeding and retracting the machine tools into and from the workpiece is accomplished through means of a conventional cam drum 80 driven by drum shaft 14 and operable to reciprocate roll 74 and arm 72 to thereby slide the tool turret 70. The invention may also be incorporated with equal advantage into lathes utilizing a cross tool slide instead of that utilized in the shown embodiment.

In accordance with the invention, an auxiliary center carrier 90 is provided in longitudinally spaced relationship with the spindle carrier 10 and comprises a circular ring-like body having eight equiangularly spaced passages 92 slidably receiving auxiliary center assemblies generally designated 94 and including auxiliary centers 95 which are in alignment with and correspond in number to the centers 34 of the multiple spindle carrier 10. The auxiliary center carrier 90 has a central passage 96 through which extends the turret 70 and is supported for rotatable movement in a carrier frame 100 having a circular through passage 102 which receives the auxiliary center carrier 90. The carrier frame 100 is in turn adjustably supported on the base 4, between longitudinally extending upper guide rails 104 and lower guide rails 106 which are suitably fixed to the top bed 12 and base 4, respectively, for permitting the position of the frame 100 to be adjusted therealong in accordance with the length of the workpieces to be machined. The guide rails 102, 104 for the carrier frame 100 are located to space the auxiliary center carrier 90 from the spindle carrier 10 so as to permit extra long workpieces dimensioned generally in the area of two to three feet in length, to be supported by the spindle and auxiliary centers 34, 95.

In order to adjustably secure the auxiliary center carrier 90 to the spindle carrier 10, provided a plurality of angularly spaced axially extending rods 110 are secured thereto preferably between the holding chucks 32 and at the same radius as the holding chuck centers 34 and the auxiliary centers 95 in order to clear the cutting tools 79. Each of the rods 110 has one end 112 suitably fixed to the spindle carrier 10 and the other end 114 received through apertures 116 provided in the auxiliary center carrier. As best shown in FIG. 7, the free end portions 118 of the rods 110 are threaded and provided with lock nuts 120 which are engageable with the opposite sides of the auxiliary center carrier 90 to adjustably secure the auxiliary center carrier 90 with respect to the spindle carrier 10 and to thereby provide a further means for adjusting the position of the auxiliary center carrier along the turret 60.

Operation of the auxiliary center assemblies 94 for loading and unloading the workpieces at two successive indexed positions thereof is accomplished by the provision of two conventional actuators such as of the air cylinder type (not shown), which are mounted in the carrier frame 100 along side two successive index positions of the center assemblies 94 and are provided with actuating arms 124 adapted to engage collars 125 fixed to the center assemblies as shown in FIG. 7. Upon actuation, the arms 124 will retract the adjacent center assembly 94 to the right (as viewed in FIG. 7) whereas return of the center assembly 94 is effected through means of the spring 127. Two loading and unloading stations are provided so as to permit, for example, the unloading of a finished workpiece at one station and the loading at that station with a partially finished workpiece that has been removed from the other station and reversed; and the loading at the other station of a new workpiece to be machined. To facilitate loading and unloading, the auxiliary center assemblies 94 are preferably actuated in unison with the chucks 32 of their corresponding spindles 30 and this may be effected by a treadle (not shown) suitably arranged to simultaneously trip the actuators of the chucks 32 and the auxiliary center assemblies 94.

In order to index the auxiliary center carrier 90 in synchronism with the spindle carrier 10, a first gear 130 is suitably fixed to the turret stem 60 for rotation therewith and a second gear 132 is connected to the auxiliary center carrier 90 for rotation therewith, the latter being accomplished in the shown embodiment (see FIG. 7) by forming the gear 132 on the end of sleeve 134, which sleeve 134 is received in the passage 96 of the auxiliary center carrier 90, around the tool slide 70, and suitably fixed to the auxiliary center carrier 90 for rotation therewith. The gears 130, 132 are connected to transmit movement of the turret stem 60 to the auxiliary center carrier 90, by a pair of identical pinions 140, 142 fixed to the opposite ends of a shaft 146 which is journaled for rotation in a bracket 148 fixed to the carrier frame 100 as shown in FIG. 7, it being understood of course that upon longitudinal adjustment of the auxiliary carrier 90 and frame 100, the gear 130 is also suitably adjusted on the turret stem 60 for appropriate mesh with the pinion gear 140. The gears 130, 132 and the pinions 140, 142 are constructed so that the speed ratio between the turret stem 60 and the auxiliary center carrier 90 is one. In this manner, the indexing movement of the spindle carrier 10 will be positively transmitted through the turret stem 60, gear 130, pinions 140, 142, sleeve 134 to the auxiliary center carrier 90 whereby the auxiliary center carrier 90 will be indexed in synchronism with spindle carrier 10.

As best shown in FIGS. 3 and 4, a locking mechanism is provided for locking the auxiliary center carrier 90 in unison with the spindle carrier 10 in each of their indexed positions, and comprises a locking pin 150 engageable in the circumferential grooves 152 provided in the auxiliary center carrier and operated through levers 154 and 156 which are pivotally mounted on a shaft 158 which in turn is mounted to the upper bed 12. The levers 154 and 156 are actuated in synchronism with the spindle carrier locking mechanism to engage and disengage the locking pin 150 by means of an arcuate cam 160 provided on the inside of a drum 162 which is mounted on the drum shaft 14 to be driven thereby.

From the foregoing, it will be seen that the present invention provides a lathe that will permit different steps of a full machining operation to be simultaneously performed with the use of standard tools, on a plurality of extra long workpieces and which in many cases will perform the full machining operation from start to finish without the necessity of retooling.

As will be apparent to persons skilled in the art, various modifications and adaptations of the structure above described will become readily apparent without departure from the spirit and scope of the invention, the scope of which is defined in the appended claims.

I claim:

1. In a multiple spindle lathe, a body, a multiple spindle carrier mounted for rotatable movement in the body, means for indexing the multiple spindle carrier, a center carrier ring axially spaced from the multiple spindle carrier and having means for receiving a plurality of auxiliary centers, said center carrier ring having an opening therethrough, a carrier frame secured to the body and supporting the center carrier ring for rotatable movement, a turret stem extending through the opening in the center carrier ring and having one end journaled in the body for rotatable movement and the other end fixed to the multiple spindle carrier for movement therewith, means connecting the turret stem and the center carrier ring for transmitting the indexing movement of the multiple spindle carrier to the center carrier ring, a tool supporting slide extending through the opening in the center ring reciprocably mounted on the turret stem, means for reciprocating the tool supporting slide in synchronism with the indexing of the spindle carrier, and adjustment means for securing the center carrier ring with respect to the carrier frame in various positions along the turret stem.

2. A multiple spindle lathe as defined in claim 1 wherein said adjustment means comprises a plurality of rods each having one end fixed to the multiple spindle carrier and having the other end extending through the center carrier ring, each rod having a pair of lock nuts threaded thereon and engageable with the opposite ends of the center carrier ring.

3. A multiple spindle lathe as defined in claim 1 wherein said means for transmitting movement from the multiple spindle carrier to the center carrier ring comprises a first gear connected to the turret stem for movement therewith, a second gear connected to the center carrier ring for movement therewith, and pinion means supported for rotatable movement by said carrier frame and connecting said first and second gears.

4. A multiple spindle lathe as defined in claim 1 wherein there is provided a means for locking the multiple spindle carrier and the center carrier ring in synchronism in each of their indexed positions.

5. In a multiple spindle lathe, a body, a multiple spindle carrier mounted for rotatable movement in the body, means for indexing the multiple spindle carrier, an auxiliary center carrier spaced from the multiple spindle carrier and having means for receiving a plurality of auxiliary centers, said auxiliary center carrier having an opening therethrough, a turret stem extending through the opening in the auxiliary center carrier and having one end journaled in the body for rotatable movement and the other end fixed to the multiple spindle carrier for movement therewith, a tool slide mounted on the turret stem for slidable movement and having means peripherally arranged thereon for securing a plurality of machining tools, a sleeve received in the opening of the auxiliary center carrier and fixed thereto for rotatable movement therewith, a first gear fixed to the turret stem for rotatable movement therewith, a second gear formed on the end of said sleeve, and pinion means connecting said first and second gears for transmitting the indexing movement of the multiple spindle carrier to the auxiliary center carrier.

6. A multiple spindle lathe comprising a lathe body, a multiple spindle carrier rotatable on the lathe body, a plurality of angularly spaced spindles mounted on the spindle carrier, an auxiliary carrier axially spaced from the spindle carrier, a plurality of auxiliary workpiece centers mounted on the auxiliary carrier in axial alignment with the spindles respectively for supporting the workpieces, an axially adjustable auxiliary frame mounted on the lathe body rotatably supporting the auxiliary carrier coaxially with the spindle carrier, a turret stem fixed to the spindle carrier, and means operatively connecting the spindle and auxiliary carriers for common rotation including axially spaced coaxial gears on the turret stem and spindle carrier and intermediate gear means meshing therewith mounted on the auxiliary frame.

7. A multiple spindle lathe comprising a lathe body, a multiple spindle carrier rotatable on the lathe body, a plurality of angularly spaced spindles mounted on the spindle carrier, means for angularly displacing the spindle carrier for indexing the spindles, an auxiliary carrier axially spaced from the spindle carrier, a plurality of auxiliary workpiece centers mounted on the auxiliary carrier in axial alignment with the spindles respectively, means for rotatably supporting the auxiliary carrier coaxially with the spindle carrier, an axially extending turret stem fixed to the spindle carrier, a tool holder support sleeve reciprocable on the turret stem, means for reciprocating the support sleeve in synchronism with the indexing of the spindle carrier, and means operatively connecting the spindle and auxiliary carriers for common angular displacement.

8. A multiple spindle lathe comprising a lathe body, a multiple spindle carrier rotatable on the lathe body, a plurality of angularly spaced spindles mounted on the carrier, an auxiliary carrier ring axially spaced from the spindle carrier having a central opening therein, a plurality of auxiliary workpiece centers mounted on the auxiliary carrier ring in axial alignment with the spindles respectively, an auxiliary frame mounted on the lathe body rotatably supporting the auxiliary carrier ring coaxially with the spindle carrier, means operatively connecting the spindle carrier and auxiliary carrier ring for common rotation, a turret stem fixed to the spindle carrier extending axially through the central opening in the auxiliary carrier ring, a tool support slide axially reciprocable on the turret stem extending through the central opening in the support ring, and means for reciprocating the tool support slide for feeding and withdrawing a slide-supported tool.

References Cited by the Examiner
UNITED STATES PATENTS

| | | | |
|---|---|---|---|
| 451,184 | 4/91 | Manville | 82—3 |
| 1,895,078 | 1/33 | Lewis | 82—3 |
| 2,280,229 | 4/42 | Groene | 82—3 X |
| 2,559,025 | 7/51 | Mialhe | 82—3 |
| 2,606,359 | 8/52 | Stradthaus | 82—3 |

WILLIAM W. DYER, JR., *Primary Examiner.*